I. KARPEN.
TIRE PROTECTOR.
APPLICATION FILED FEB. 5, 1914.

1,202,725.

Patented Oct. 24, 1916.
2 SHEETS—SHEET 1.

Witnesses:

Inventor
Isaac Karpen

I. KARPEN.
TIRE PROTECTOR.
APPLICATION FILED FEB. 5, 1914.
1,202,725. Patented Oct. 24, 1916.
2 SHEETS—SHEET 2.
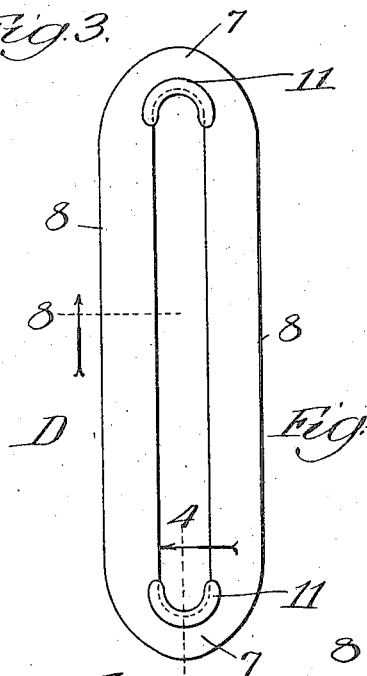
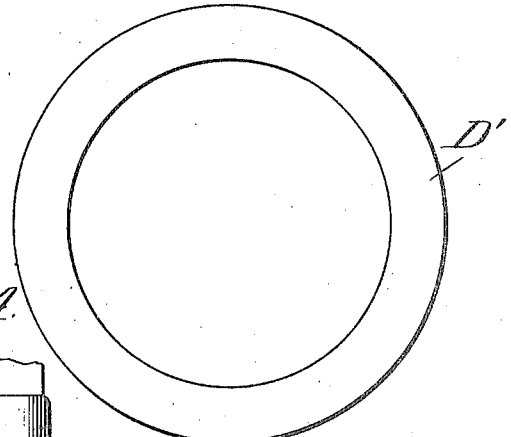
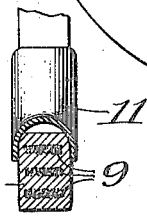
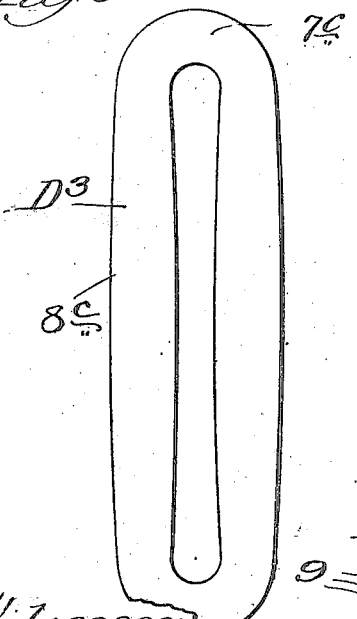
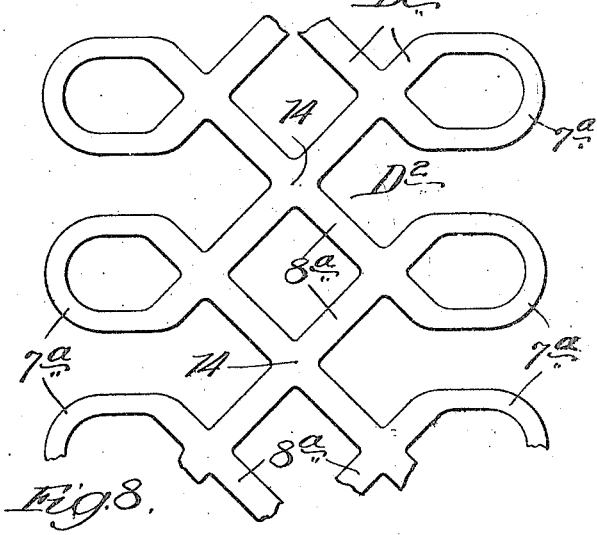
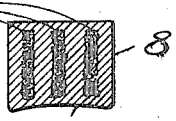
Witnesses:
Inventor.
Isaac Karpen.

UNITED STATES PATENT OFFICE.

ISAAC KARPEN, OF CHICAGO, ILLINOIS.

TIRE-PROTECTOR.

1,202,725.

Specification of Letters Patent. Patented Oct. 24, 1916.

Application filed February 5, 1914. Serial No. 816,787.

*To all whom it may concern:*

Be it known that I, ISAAC KARPEN, a citizen of the United States, residing at Chicago, in the county of Cook and State of Illinois, have invented a new and useful Improvement in Tire-Protectors; of which the following is a specification.

This invention relates particularly to devices adapted for the protection of pneumatic tires.

The invention contemplates the use of preferably elastic tread-blocks stretched across the tread-portion of the tire and removably secured in place, said tread-blocks to be used continuously until worn out, when they can be replaced by others. The tread-blocks thus serve both as a tire-protecting means and anti-skid means, always in place on the tire and nevertheless free from all rattling and injurious effect upon the tire. In fact, the improved device serves as a constant protection to the pneumatic tire and preserves the integrity of the tire for a prolonged period, while the comparatively inexpensive tread-blocks can be renewed as frequently as required, thereby effecting great economy, as well as insuring the motorist against tire troubles and against dangerous skidding.

The invention is illustrated in its preferred embodiment in the accompanying drawings, in which—

Figure 1:
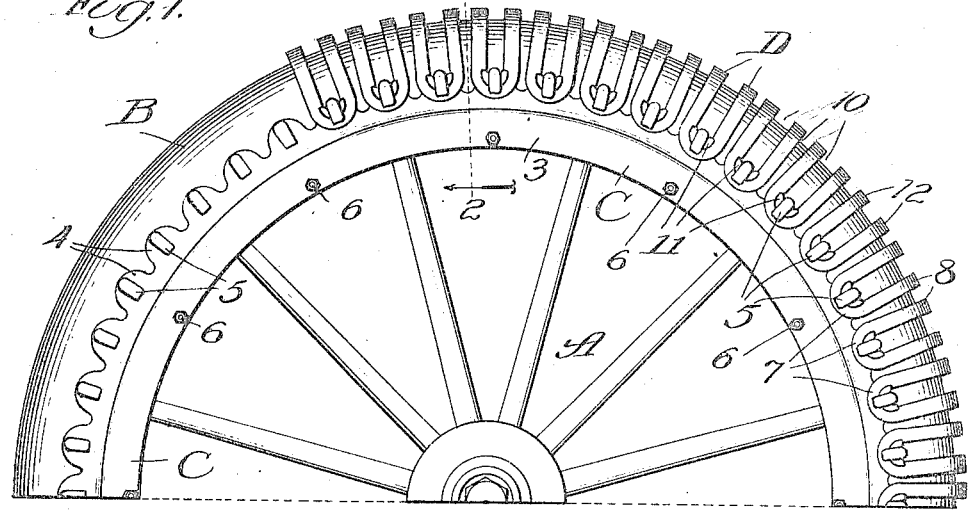
Figure 2:
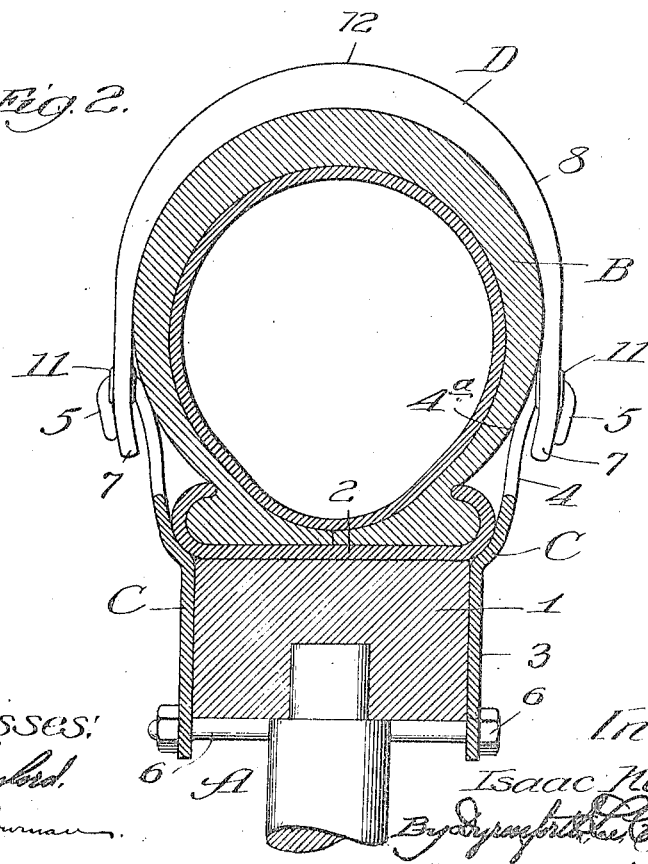

Figure 1 represents a broken elevational view of a wheel provided with a pneumatic tire and equipped with my improved tire-protecting means; Fig. 2, an enlarged sectional view taken as indicated at line 2 of Fig. 1; Fig. 3, a view of one of the elastic tread-blocks employed; Fig. 4, an enlarged broken section taken as indicated at line 4 of Fig. 3; Fig. 5, a view similar to Fig. 3, but showing a slight modification; Fig. 6, a view of an elastic tread-block of modified form, before it is stretched across and thereby given an elongated form and curved to conform to the curvature of the tire; Fig. 7, a broken view showing a series of united tread-blocks, giving the effect of a continuous open-work elastic tire armor; and Fig. 8, a section taken as indicated at line 8 of Fig. 3.

In the construction shown in Figs. 1 to 4, inclusive, A represents a wheel having a felly 1, equipped with a rim 2; B, a pneumatic tire applied to the wheel; C, annular, hook-equipped plates secured to the wheel; and D, elastic tread-blocks stretched across the tire and engaging the hooks of the members C. The annular retainer-plates C may be stamped from sheet-metal. They have inner felly-embracing portions 3 and outer tire-supporting portions 4 equipped with outwardly and downwardly turned hooks 5, which are preferably equi-distant from each other. The members C are preferably secured to the felly by clamping or otherwise, as by means of bolts 6. Each tread-block preferably comprises a pair of hook-engaging loops 7 and a plurality of elastic tread-engaging members 8, stretched across the tread-portion of the tire. It is preferred to make each tread-block of rubber, or of a suitable rubber compound, which may, if desired, have embedded therein fiber or canvas strips 9, as illustrated in Figs. 4 and 8. The tread-blocks are desirably made of substantial size and durable materials, for the two-fold purpose of holding the tread-portion of the tire out of contact with the pavement and serving with certainty the function of an anti-skid device, the further purpose being to obviate the necessity of frequent renewals of the tread-blocks. It is highly desirable to use a material having the elastic properties, impermeability and wear-resisting qualities of rubber, and any material having these qualities is to be regarded as an equivalent of rubber.

The tread-engaging portions 8 of the tread-block D are preferably made of a larger cross-section than the loop-portions 7, thus placing the bulk of the rubber at the location where it is most needed for resisting purposes as well as for the purpose of elevating the tire from the pavement and forming suitably deep interstices or spaces 10, which aid in the anti-skidding function of the device.

The tread-blocks may be molded, or may be formed in any suitable manner. It is preferred to provide the loops 7 at their inner concaved portions with metal clips 11, thus armoring the loops at the points where they engage the hooks 5. Fig. 2 shows the tread-portions of the tread-blocks thicker than the loop-portions, and the tread-portions A are preferably deepest and of greatest cross-section directly over the largest circumference of the wheel, as indicated at 12 in Fig. 2. The tread-blocks may be of elongated form shown in Figs. 3 and 5, and may be bent to conform to the cross-section of the tire in stretching the tread-blocks upon the hooks 5. As shown in Fig. 8, the lower or inner surfaces at the tread-portions 8 of the tread-blocks may be made slightly concaved to conform to the tire as indicated at 13.

In the construction illustrated in Fig. 6, the tread-block $D^1$ is originally made in circular form, and may be of uniform cross-section. In applying a tread-block of this form, it is stretched to the elongated form and caused to engage the hooks 5; and, if desired, after the tread-blocks of this form have been used for a time, they may be shifted on the hooks so that the worn portions will engage the hooks, while the portions which formerly engaged the hooks will be disposed over the tread-portion of the tire.

In Fig. 7, there are illustrated a series of tread-blocks $D^2$, each comprising loops $7^a$ and tread-engaging portions $8^a$ uniting the loops; and the tread-blocks $D^2$ are shown united at the points 14, thus giving the effect of a continuous united series of tread-blocks having the loops $7^a$ spaced to correspond with the spacing of the hooks 5. Here, again, it is preferred to make the tread-engaging portions of the tread-blocks of greater cross-section than the loop-portions.

In Fig. 5, $D^3$ represents a tread-block similar to the tread-block D shown in Fig. 3, but having the tread-portions $8^c$ of greater width than the loop-portions $7^c$.

It is desirable, though not essential, when the tread-blocks are separately formed, to so proportion and form the tread-portions and stretch the tread-blocks across the tire so tightly that the tread-portions will retain their proper seating on the tread-portion of the tire in the manner illustrated. Nevertheless, a certain amount of yielding is desirable to prevent injury, when the tread-blocks strike violently against projections in the road. It is desirable to shape the portions 4 of the annular plates C, so that they will present rounded surfaces $4^a$ to the tire above the tire-holding flanges of the rim 2, so that the tire will be supported and enforced, and still will not be injured by the retainer plates.

From the description given, it will be understood that the elastic tread-blocks employed snugly embrace the tire, and may be used continuously until worn out, when they can be readily replaced. The wheel, thus protected, will run smoothly and quietly over a pavement, the pneumatic tire will be protected from wearing and very largely protected from danger of puncture, and the integrity of the tire will be preserved, thus avoiding danger of blow-out and preserving the expensive tire for a prolonged period. The tread-blocks can be produced cheaply, and the tire can be thus preserved in practically perfect condition, even though subjected to prolonged usage of the hardest character. Moreover, the anti-skidding function of the tread-blocks is always present, thus tending to the further preservation of the tire, as well as obviating danger to the machine and its occupants.

The foregoing detailed description has been given for clearness of understanding only, and no unnecessary limitation should be understood therefrom, and the appended claims should be construed as broadly as permissible in view of the prior art.

What I regard as new, and desire to secure by Letters Patent, is—

1. The combination with a wheel equipped with a pneumatic tire, of annular plates equipped with spaced hooks, and elastic tread-blocks stretched across the tread-portion of the tire and engaging said hooks, each tread-block comprising hook-engaging loops and a plurality of rubber tread-engaging members separated from each other by spaces and extending across the tread of the tire.

2. The combination with a wheel equipped with a pneumatic tire, of rubber tread-blocks stretched across the tread-portion of the tire, each tread-block comprising hook-engaging loops and a plurality of rubber tread-engaging members extending across the tire, and annular plates secured to the wheel and having hooks engaging said loops at the sides of the tire.

3. The combination with a wheel equipped with a pneumatic tire, of annular plates equipped with spaced hooks, and elastic tread-blocks stretched across the tread-portion of the tire, each tread-block comprising hook-engaging loops connected by rubber tread-portions of relatively large cross-section which are separated from each other by spaces.

4. The combination with a wheel equipped with a pneumatic tire, of tread-blocks stretched across the tread-portion of the tire, each tread-block being of elongated form and comprising loops connected by a plurality of rubber tread-engaging strips, and annular plates secured to the wheel and having spaced hooks engaging said loops at the sides of the tire.

5. The combination with a wheel equipped with a pneumatic tire, of tread-blocks stretched across the tire, each tread-block comprising a pair of armored loops and rubber tread-engaging strips connecting said loops, and annular plates secured to the wheel and equipped with hooks engaging said loops at the sides of the tire.

6. The combination of a wheel equipped with a pneumatic tire, of a series of elastic tread-blocks stretched across the tire and comprising a series of attaching loops and rubber tread-pieces connecting said loops, a plurality of said tread-blocks being united at their tread-pieces, and annular plates secured to said wheel and equipped with spaced hooks engaging said loops.

ISAAC KARPEN.

In presence of—
A. C. FISCHER,
O. C. AVISUS.